US011434927B2

United States Patent
Bogner et al.

(10) Patent No.: US 11,434,927 B2
(45) Date of Patent: Sep. 6, 2022

(54) RADIAL COMPRESSOR HAVING AN IRIS MECHANISM FOR A SUPERCHARGING DEVICE OF AN INTERNAL COMBUSTION ENGINE, SUPERCHARGING DEVICE AND BLADE FOR THE IRIS MECHANISM

(71) Applicant: Vitesco Technologies GMBH, Hannover (DE)

(72) Inventors: Mathias Bogner, Straubing (DE); Christoph Schäfer, Coburg (DE); Sasa Slavic, Heidelberg (DE)

(73) Assignee: Vitesco Technologies GmbH, Regensburg (DE)

( * ) Notice: Subject to any disclaimer, the term of this patent is extended or adjusted under 35 U.S.C. 154(b) by 215 days.

(21) Appl. No.: 16/818,073

(22) Filed: Mar. 13, 2020

(65) Prior Publication Data

US 2020/0208651 A1    Jul. 2, 2020

Related U.S. Application Data

(63) Continuation of application No. PCT/EP2018/070145, filed on Jul. 25, 2018.

(30) Foreign Application Priority Data

Sep. 14, 2017  (DE) .......................... 102017216327.5

(51) Int. Cl.
  *F04D 29/46*      (2006.01)
  *F01D 17/14*      (2006.01)
  (Continued)

(52) U.S. Cl.
  CPC ......... *F04D 29/464* (2013.01); *F01D 17/141* (2013.01); *F04D 17/10* (2013.01);
  (Continued)

(58) Field of Classification Search
  CPC .... F04D 29/464; F04D 17/10; F04D 29/4213; F04D 27/0253; F01D 17/141
  See application file for complete search history.

(56) References Cited

U.S. PATENT DOCUMENTS

| 2014/0308110 A1 | 10/2014 | Houst et al. |
| 2015/0041695 A1* | 2/2015 | Daniels .................. F16K 31/53 |
| | | 251/212 |

(Continued)

FOREIGN PATENT DOCUMENTS

DE       102011121996 A1    6/2013

OTHER PUBLICATIONS

International Search Report and Written Opinion dated Oct. 18, 2018 from corresponding International Patent Application No. PCT/EP2018/070145.

(Continued)

*Primary Examiner* — J. Todd Newton, Esq.

(57) ABSTRACT

A radial compressor has an iris diaphragm mechanism for a pressure-charging device of an internal combustion engine. The radial compressor has a bearing assembly, in which a rotor shaft is rotatably mounted, having a compressor impeller arranged in a compressor housing for conjoint rotation on the rotor shaft and having a fresh air supply channel for carrying a fresh air mass flow to the compressor impeller. The iris diaphragm mechanism is upstream of the compressor impeller, allowing variable adjustment of a flow cross section for the fresh air mass flow for admission to the compressor impeller, at least over a partial region. The iris diaphragm mechanism has a plurality of blades, each having at least one first and one second blade section, wherein an offset is formed between the first blade section and the second blade section of the respective blade.

19 Claims, 4 Drawing Sheets

(51) Int. Cl.
*F04D 29/42* (2006.01)
*F16K 3/03* (2006.01)
*F04D 17/10* (2006.01)

(52) U.S. Cl.
CPC ............ *F04D 29/4213* (2013.01); *F16K 3/03* (2013.01); *F05D 2220/40* (2013.01); *F05D 2250/51* (2013.01)

(56) References Cited

U.S. PATENT DOCUMENTS

| | | | |
|---|---|---|---|
| 2016/0177956 A1* | 6/2016 | Mohtar | F04D 27/0253 |
| | | | 417/406 |
| 2016/0265424 A1 | 9/2016 | Tingaud et al. | |
| 2017/0211707 A1* | 7/2017 | Wakayama | F16K 3/03 |
| 2017/0298943 A1* | 10/2017 | Mohtar | F04D 27/0253 |

OTHER PUBLICATIONS

German Patent Office Search Report dated Jun. 24, 2020 for the counterpart German Patent Application No. 10 2017 216 327.5.

* cited by examiner

RADIAL COMPRESSOR HAVING AN IRIS MECHANISM FOR A SUPERCHARGING DEVICE OF AN INTERNAL COMBUSTION ENGINE, SUPERCHARGING DEVICE AND BLADE FOR THE IRIS MECHANISM

CROSS REFERENCE TO RELATED APPLICATIONS

This U.S. patent application claims the benefit of PCT patent application No. PCT/EP2018/070145, filed Jul. 25, 2018, which claims the benefit of German patent application No. 10 2017 216 327.5, filed Sep. 14, 2017, both of which are hereby incorporated by reference.

TECHNICAL FIELD

The invention relates to a radial compressor having an iris diaphragm mechanism for a pressure-charging device of an internal combustion engine. The invention furthermore relates to a pressure-charging device having a compressor of this kind, and to a blade for an iris diaphragm mechanism of the radial compressor.

BACKGROUND

Pressure-charging devices are increasingly being used to increase power in internal combustion engines, especially in motor vehicle internal combustion engines. More and more frequently, this is done with the aim of reducing the overall size and weight of the internal combustion engine for the same power or even increased power and, at the same time, of reducing consumption and thus $CO_2$ emissions, with regard to ever stricter legal requirements in this respect. The principle in action consists in increasing the pressure in an intake tract of the internal combustion engine and thus bringing about better filling of a combustion chamber of the internal combustion engine with atmospheric oxygen. In this way, more fuel, such as gasoline or diesel, can be converted in each combustion process, i.e. the power of the internal combustion engine can be increased.

One specific example of a pressure-charging device of this kind is an exhaust-gas turbocharger, which uses the energy contained in the exhaust-gas flow to produce the pressure in the intake tract. To this end, the exhaust-gas turbocharger has an exhaust-gas turbine arranged in the exhaust tract of the internal combustion engine, a radial compressor arranged in the intake tract and a rotor bearing arranged therebetween. The exhaust-gas turbine has a turbine housing and a turbine impeller arranged therein, which is driven by the exhaust-gas mass flow.

The radial compressor has a compressor housing and a compressor impeller arranged therein, which builds up a boost pressure. The turbine impeller and the compressor impeller are arranged for conjoint rotation on the opposite ends of a common shaft, referred to as the rotor shaft, and thus form what is referred to as the turbocharger rotor. The rotor shaft extends axially between the turbine impeller and compressor impeller through the rotor bearing arranged between the exhaust-gas turbine and radial compressor. The rotor shaft is rotatably mounted in said rotor bearing in the radial and axial directions in relation to the rotor shaft axis. According to this construction, the turbine impeller driven by the exhaust-gas mass flow drives the compressor impeller via the rotor shaft, thereby increasing the pressure in the intake tract of the internal combustion engine behind the radial compressor in relation to the fresh air mass flow, and thereby ensuring better filling of the combustion chamber with atmospheric oxygen.

As an alternative, it is also possible, in a pressure-charging device of this kind, to use an electric-motor drive unit to drive the radial compressor instead of an exhaust-gas turbine, for example. A pressure-charging device of this kind is also referred to as an "E-booster" or "E-charger". However, a mechanical coupling to the internal combustion engine, e.g. via an intermediate transmission, can also be used to drive the radial compressor.

The operating behavior of the radial compressor is characterized by a "compressor characteristic map", which describes the pressure buildup against mass flow for various compressor speeds of rotation or peripheral speeds. A stable and usable characteristic map of the radial compressor is bounded by the "surge limit" toward low flow rates, by the "choke limit" toward higher flow rates, and by the maximum rotational speed limit in respect of structural mechanics.

In adapting an exhaust-gas turbocharger to an internal combustion engine, a radial compressor is selected which has a compressor characteristic map that is as expedient as possible for the internal combustion engine. The following preconditions should be satisfied here: an engine full-load curve should be completely within the usable compressor characteristic map; minimum clearances with respect to the characteristic map limits, as required by the vehicle manufacturer, should be maintained; maximum compressor efficiencies should be available at the rated load and in a range of a lower low-end torque point of the internal combustion engine; and the compressor impeller should have a minimum moment of inertia.

Simultaneously satisfying all the preconditions mentioned would be possible only to a limited extent with a conventional radial compressor without additional measures. The following conflicting aims would arise owing to opposing trends, for example: reduction in the moment of inertia of the radial compressor and maximization of the characteristic map width and of the peak efficiency, reduction of scavenging in the region of the lower low-end torque and maximization of the specific rated power, improvement of the response and increase in the specific rated power of the internal combustion engine.

The stated conflicting aims could be resolved by a compressor design which has a wide characteristic map with a minimum moment of inertia and maximum efficiencies on the full-load curve of the engine.

Apart from the steady-state requirements mentioned, stable operating behavior of the radial compressor must be ensured in transient operating states as well, e.g. in the case of rapid load shedding by the internal combustion engine. This means that, in the case of a radial compressor, the damaging "compressor surge" must be avoided in the case of a sudden decrease in the compressor mass flow delivered.

While being restricted to the compressor inlet of a radial compressor, the abovementioned solution has hitherto been achieved by additional measures, such as adjustable inlet guide vanes, measures for reducing an inlet cross section of the radial compressor or a fixed recirculation channel, also referred to as a ported shroud or characteristic-map-stabilizing measure. In the case of the variable solutions, the widening of the useful working range of the radial compressor is achieved by actively shifting the characteristic map. In the case of engine operation at low speeds and flow rates, the compressor characteristic map is thus shifted "to the left", toward low mass flows, while, in engine operation at high speeds and flow rates, the compressor characteristic map is not shifted or is shifted "to the right", toward higher mass flows.

Through the adjustment of vane angles and the induction of a pre-swirl in or counter to the direction of rotation of the compressor impeller, the inlet guide vanes shift the entire compressor characteristic map toward lower or higher flow rates. However, the required adjusting mechanism and the inlet guide vanes themselves represent a complex solution.

The measures involving narrowing the compressor inlet by reducing the cross section shift the compressor characteristic map toward lower flow rates since the inlet cross section is reduced by closing the structure directly ahead of the radial compressor. In the open state, the measures as far as possible expose the entire inlet cross section again and in this way influence or shift the characteristic map either not at all or only marginally.

The fixed recirculation channel is a passive solution. It extends the useful characteristic map range of the radial compressor without fundamentally shifting the characteristic map thereof.

To avoid compressor surge in the case of rapid load shedding, a "blowoff valve" is usually used, said valve opening a bypass from the compressor outlet to the compressor inlet in the case of a sudden decrease in the mass flow of boost air through the internal combustion engine and in this way keeping the radial compressor in the stable characteristic map range to the right of the surge limit. A combination of active measures, such as variable inlet guide vanes and the blowoff valve, is conceivable but unusual.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A radial compressor for a pressure-charging device of an internal combustion engine which contributes to reliable operation of the pressure-charging device with a simultaneously extended characteristic map range is provided. Moreover, to make available a blade for an iris diaphragm mechanism of the radial compressor which makes possible the abovementioned concept for the radial compressor. A pressure-charging device for an internal combustion engine by means of which the radial compressor can be implemented during the operation of the internal combustion engine.

A radial compressor for a pressure-charging device of an internal combustion engine is disclosed. The radial compressor has a bearing assembly, in which a rotor shaft is rotatably mounted. The turbocharger furthermore has a compressor impeller, which is arranged in a compressor housing and which is arranged for conjoint rotation on the rotor shaft. The radial compressor furthermore has a fresh air supply channel, which is designed to carry a fresh air mass flow to the compressor impeller.

An iris diaphragm mechanism is arranged in the air supply channel upstream of the compressor impeller in the air mass flow and is designed to at least partially close or open a diaphragm aperture, thus allowing variable adjustment of a flow cross section for the fresh air mass flow, e.g. a cross section of the fresh air supply channel, for admission to the compressor impeller, at least over a partial region. The iris diaphragm mechanism has a plurality of blades, wherein each blade has at least one first and one second blade section and wherein an offset is formed in a direction perpendicular to a principal plane of extent of the blade, at least between the first blade section and the second blade section of the respective blade.

In one exemplary embodiment of the radial compressor, a variable iris diaphragm mechanism is provided, which is arranged in the fresh air supply channel directly ahead of the compressor inlet for the purpose of shifting the characteristic map. The iris diaphragm mechanism can also be referred to as an iris diaphragm or iris restrictor and has the task of adjusting the inlet mass flow of the radial compressor, at least over a partial region. In this case, the iris restrictor acts like a kind of mask for an outer region of the compressor inlet. As restriction increases, i.e. as the cross section is narrowed, the iris restrictor as it were takes on the function of a blowoff valve since it can prevent compressor surge of the radial compressor. This makes it possible to actively influence the operating range of the radial compressor and, in addition, to keep the radial compressor at a stable operating point in the event of sudden load shedding by the engine.

The fresh air supply channel is formed on the radial compressor. For example, the fresh air supply channel is formed at least partially by the compressor housing, the iris diaphragm mechanism, an intake stub and/or other components of the radial compressor.

In one exemplary embodiment, the iris diaphragm mechanism has a plurality of blades, which can be moved relative to one another by rotation and which are arranged in partial overlap with one another over the circumference of the fresh air supply channel, concentrically with the center line of the fresh air supply channel or compressor inlet. Each blade is mounted on a fixed bearing part in such a way as to be rotatable about a respective pivot point, preferably arranged in an edge region of the blade, and is operatively connected to an actuating element, which may be arranged in a blade edge region opposite the pivot point, by means of a movably mounted adjusting ring.

Each blade may have a substantially plate-shaped, flat blade main body, which is used to screen the fresh air mass flow and thus to set the diaphragm aperture. Here, the blade main body extends, for example, in a principal plane of extent in the form of a circular ring segment over part of a circular arc, with the ring width remaining the same or varying over the circular arc. Each blade or the respective blade main body has at least one first and one second blade section, wherein an offset is formed in the axial direction of the fresh air supply channel and thus in a direction perpendicular to the principal plane of extent of the blade at least between the first blade section and the second blade section of the respective blade.

The bearing part is, for example, a bearing ring fixed in the region of the fresh air supply channel, a separate housing of the iris diaphragm mechanism, part of the compressor housing of the turbocharger or formed in several parts, e.g. by part of the compressor housing and a separate additional housing part. In this case, the bearing part is of ring-shaped design or has a ring-shaped section. The bearing part can also be a fixed housing element.

In this exemplary embodiment, the adjusting ring is arranged concentrically with the bearing part and can be rotated around the common center line, which simultaneously forms the center line of the fresh air supply channel or compressor inlet. The blades are synchronized and moved jointly by means of the adjusting ring. The rotation of the blades about the respective pivot point thereof is also initiated by means of the actuating element by rotating the adjusting ring about its center line. When the blades are rotated parallel to the axis of rotation of the compressor impeller, the blades pivot radially inward and thus lead to a desired narrowing of the flow cross section directly ahead of the compressor impeller. The adjusting ring itself is controlled and moved by means of actuator, for example. The actuator can be an electrically or pneumatically operated adjuster.

For rotary mounting on the bearing part, a blade has, for instance, a bearing element, which is arranged in a bearing section in an end region of the first blade section of the blade main body, for example. For rotary actuation of the blade, the blade main body has an actuating element, e.g. in an actuating region located opposite the bearing section and situated in an end region of the second blade section. The two mutually offset blade sections preferably have wall thicknesses that are substantially the same and remain constant over their extent.

Both the bearing element and the actuating element are designed as pin- or peg-shaped bodies, for example, which typically extend substantially perpendicularly to a principal plane of extent of the blade main body.

By virtue of the fact that a first and a second blade section of each blade are offset relative to one another, in particular offset parallel to one another, a contribution is made to enabling the blades of the iris diaphragm mechanism to slide past one another without resistance in the regions in which they overlap. As a result, the blades are not distorted as the mechanism is closed, i.e. during a narrowing of the cross section. This furthermore enables the blades to be made thicker and stiffer, that is to say more stable overall, thus making it possible to ensure increased strength of the blades. This is necessary since not inconsiderable forces are applied to the blades by the medium flowing past. This is a difference with respect to the iris diaphragms known from optics, the blades of which can, in contrast, be formed exclusively so as to be flat with a constant, particularly small wall thickness since, in this case, no forces acting perpendicularly on the principal plane of extent of the blades occur. In other words, the formation of an offset enables a thickness of the blades to be a freely selectable design parameter. Moreover, the blades contribute to a robust, long-lived and low-cost design of the iris diaphragm mechanism, which, in turn, has an effect on reliability of the turbocharger.

Here and below, "offset" may, for example, mean that the first blade section and the second blade section each have a principal plane of extent which is arranged offset parallel to the other. In this case, the principal plane of extent should be taken to mean a central plane of the respective blade section, which extends at the same distance from a front and a rear surface of the respective blade section. In other words, both a front side and a rear side of a blade have an offset in the same direction. Expressed in different terms, a front side of the first blade section defines a first reference plane and a rear side of the first blade section defines a second reference plane, wherein the front side of the second blade section is offset parallel to the first reference plane, and the rear side of the second blade section is offset parallel in the same direction to the second reference plane. The concept described also contributes to resolving the abovementioned conflicting aims.

According to one embodiment, the offset of the blade sections relative to one another in a direction perpendicular to a principal plane of extent of the blade is formed by one or more cranked offsets or by one or more step-type offsets.

A cranked offset is a formed feature, in particular a bend, in the blade such that parts which are not bent, in this case the two blade sections after the forming process, extend with a parallel offset and, between the two blade sections, a transitional region extending obliquely from one blade section to the other blade section is formed. The cranked shape enables the blades to be made particularly thick and stiff, as mentioned at the outset. In the case of a cranked offset, the wall thickness of a blade remains substantially constant, including in the transitional region. Furthermore, a contribution is made to enabling the blades to be designed as simple formed parts, thereby allowing production costs to be kept low. Here, a respective blade can have a plurality of cranked offsets, whereby a plurality of blade sections, each with a transitional region, is formed therebetween, resulting overall in a step-shaped profile of the blade surface with a plurality of steps.

The provision of one or more step-type offsets similarly contributes to stiff and robust blades, wherein the front and rear side of the blade equally have a step extending perpendicularly to the principal plane of extent. In this case, the step-type offsets on the front and the rear side of the blade may be arranged offset relative to one another in such a way that a region with an increased wall thickness is obtained in the transitional region between the two blade sections. A blade of this kind with step-type offsets is produced as an injection-molded part, for example. This contributes to low-cost production, wherein complex geometries can be produced without the need for forming measures.

The provision of a plurality of cranked offsets or of a plurality of step-type offsets enables larger areas of overlap to be provided between the blades, wherein in each case more than two blades overlap each other and thus more than two blades can slide simultaneously over each other in the axial direction (in relation to the center line of the diaphragm aperture or of the compressor inlet). This has an effect on a minimum opening width or opening diameter of the diaphragm. For example, a number of blades independent of a desired minimum opening cross section can be provided.

According to an embodiment that has step-type offsets, the first and the second blade section are connected via at least one central part of a blade, wherein the at least one central part has a greater wall thickness than the first or the second blade section. For example, the at least one central part has a double wall thickness in comparison with the first or the second blade section. The first and the second blade section have the same wall thickness, for example, and are offset in parallel relative to one another by means of one or more step-type offsets. An embodiment of this kind is distinguished by high stiffness.

According to one embodiment, the blades are arranged in such a way that a substantially constant clearance is formed between the blades during the closure and opening of the diaphragm aperture. By virtue of the offset in a blade between the blade sections, it is possible for the blades to have and to maintain a constant clearance with respect to one another during the closure and opening of the diaphragm aperture. Adjusting forces, especially in the case of severe contamination in gaps in the blades, can thereby be minimized or kept low. In this way, sticking of the blades due to distortion thereof during closure or opening can be avoided. By virtue of the free choice of blade clearance, high tolerance requirements in respect of the flatness and shape of the blades are furthermore also unnecessary. This contributes to a robust, long-lived and low-cost design of the iris diaphragm mechanism.

According to one embodiment, an end stop for the definition of a minimum opening width of a diaphragm aperture of the iris diaphragm mechanism is formed by the offset of each blade. In other words, each blade runs onto the offset stage of the blade with which it overlaps during the closure of the iris diaphragm mechanism with a minimum opening width. By virtue of the offset, an end stop and hence a minimum opening position of the iris diaphragm mechanism is thus integrated into the component itself. The minimum opening width can be predetermined by a number of the blades and/or a position of an offset stage, which is formed by a cranked offset or a step-type offset. Here, the offset stage is formed on the upper and/or the lower side of a blade, for example. Three or four blades can be provided in the diaphragm mechanism, for example. This also applies to blades that have a plurality of step-type offsets or a plurality of cranked offsets, wherein the minimum opening width is limited by the number and/or selective positioning of the offset stages.

Moreover, a blade for an iris diaphragm mechanism of a radial compressor is disclosed, wherein the blade has at least one first and one second blade section and wherein an offset is formed in a direction perpendicular to a principal plane of extent of the blade at least between the first blade section and a second blade section. The blade essentially permits the above-stated advantages and functions. What has been stated above in respect of the radial compressor applies equally, wherein the blade can be developed further in accordance with the above embodiments.

The pressure-charging device for an internal combustion engine is characterized in that the pressure-charging device has a radial compressor in accordance with one of the embodiments described above, wherein the pressure-charging device is designed as an exhaust-gas turbocharger or as a charger operated by electric motor or as a charger operated via a mechanical coupling to the internal combustion engine. Thus, for example, the pressure-charging device is designed as an exhaust-gas turbocharger which has an exhaust-gas turbine for driving the compressor impeller of the compressor or, alternatively, is designed as a charger operated by electric motor (also referred to as an E-booster), which has an electric motor drive to drive the compressor impeller of the compressor.

As an alternative to the abovementioned embodiments, the pressure-charging device can furthermore also be designed as a charger operated via a mechanical coupling to the internal combustion engine. Such a coupling between the internal combustion engine and the radial compressor can be accomplished by means of an intermediate transmission, for example, which is operatively connected to a rotating shaft of the internal combustion engine, on the one hand, and to the rotor shaft of the radial compressor, on the other hand.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
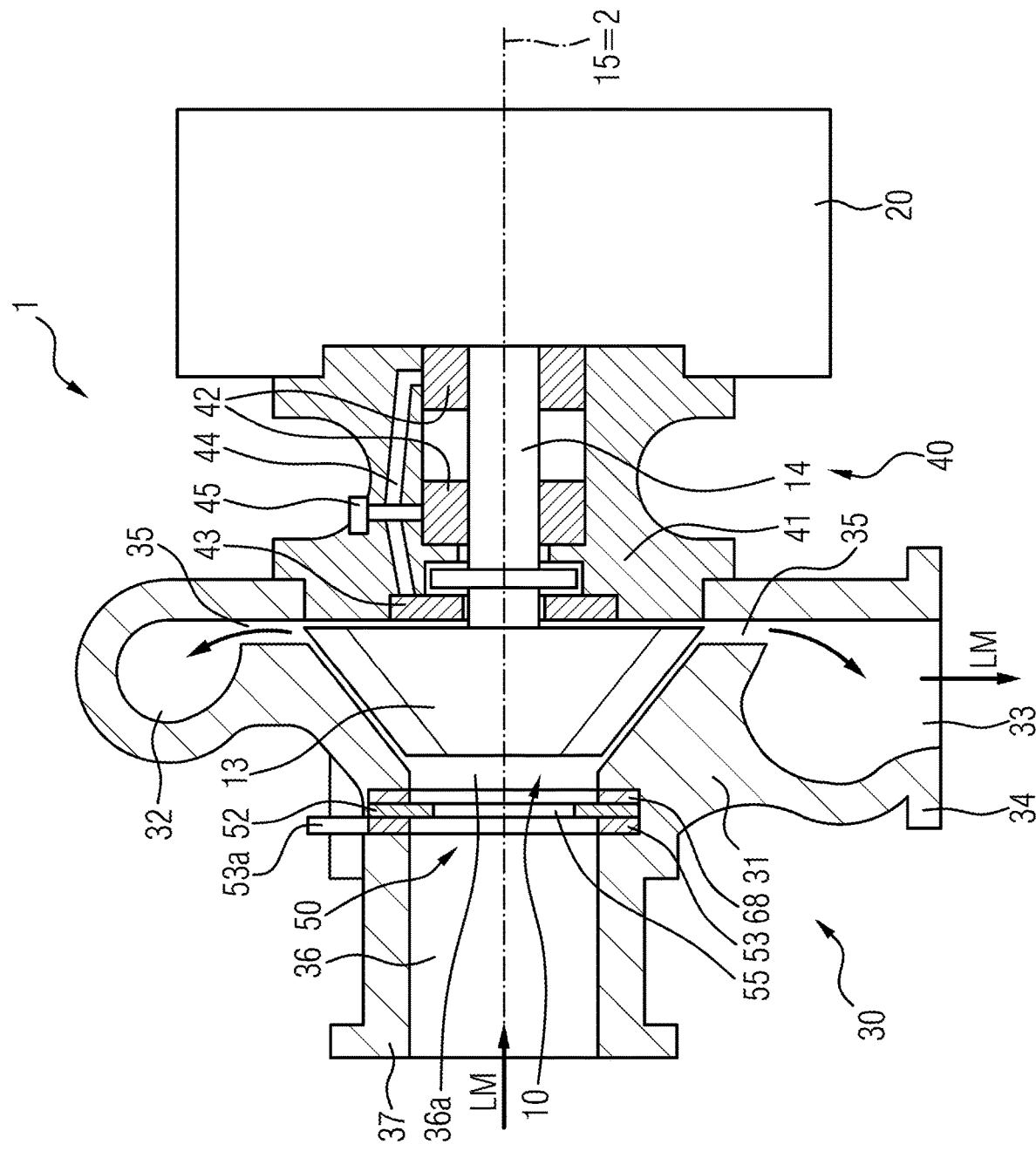
FIG. 1 shows a schematically simplified sectional view of one embodiment of a pressure-charging device according to the invention having a radial compressor with an iris diaphragm mechanism.

FIG. 1 shows an embodiment of a pressure-charging device 1 schematically in section. The pressure-charging device 1 has an embodiment of a radial compressor 30, a bearing assembly 40 and a drive unit 20. The radial compressor 30 has a compressor impeller 13, which is arranged in a compressor housing 31, is arranged for conjoint rotation on a rotor shaft 14 rotatably mounted in a bearing assembly 40, and thus forms what is referred to as the charger rotor 10. The charger rotor 10 rotates about a rotor axis of rotation 15 of the rotor shaft 14 during operation. The rotor axis of rotation 15 simultaneously forms the charger axis 2 or compressor axis (which can also simply be referred to jointly as the longitudinal axis of the pressure-charging device), is formed by the center line depicted and indicates the axial orientation of the pressure-charging device 1. In this example, the rotor shaft 14 of the charger rotor 10 is mounted by means of two radial bearings 42 and an axial bearing disk 43 in a bearing housing 41, which together form a bearing assembly 40. Here, both the radial bearings 42 and the axial bearing disk 43 are supplied with lubricant via oil supply channels 44 of an oil connection 45.

According to the exemplary embodiment shown, a pressure-charging device 1 of the kind illustrated in FIG. 1 has a multi-part construction. Here, a housing of the drive unit 20, a compressor housing 31 that can be arranged in the intake tract of the internal combustion engine, and a bearing assembly 40 provided between the housing of the drive unit 20 and compressor housing 31 are arranged adjacent to one another with respect to the common charger axis 2 and connected together in terms of assembly. In this case, alternative arrangements and configurations of the drive unit and the bearing assembly are also quite possible. A further structural unit of the pressure-charging device 1 is represented by the charger rotor 10, which has at least the rotor shaft 14 and the compressor impeller 13, which is arranged in the compressor housing 31.

The radial compressor 30 furthermore has an air supply channel 36, which adjoins the compressor housing 31 and forms the compressor inlet 36a, for carrying an air mass flow LM to the compressor impeller 13, said channel having an intake pipe connection stub 37 for connection to the air intake system (not illustrated) of the internal combustion engine and extending in the direction of the charger axis 2 toward the axial end of the compressor impeller 13. Via this air supply channel 36, the air mass flow LM is drawn in from the air intake system by the compressor impeller 13 and carried to the compressor impeller 13. The air supply channel 36 can also be part of an intake stub and thus not part of the compressor housing 31 but adjoins the compressor inlet 36a formed on the compressor housing 31, for example. In this arrangement, the iris diaphragm mechanism 50 is fixed in the air supply channel 36 and/or forms a partial region of the air supply channel 36 directly ahead of the compressor inlet 36a of the compressor housing 31.

Furthermore, the compressor housing 31 generally has a ring-shaped channel which is arranged in ring-shaped fashion around the charger axis 2 and the compressor impeller 13 and which widens in spiral fashion away from the compressor impeller 13, and which is referred to as a spiral channel 32. Said spiral channel 32 has a gap opening which runs at least over a part of the inner circumference and which has a defined gap width, referred to as a diffuser 35, which, directed in a radial direction away from the outer circumference of the compressor impeller 13, runs into the spiral channel 32 and through which the air mass flow LM flows away from the compressor impeller 13 at elevated pressure into the spiral channel 32. Here, therefore, the spiral channel 32 serves to receive and discharge the compressed air mass flow LM flowing away from the compressor impeller 13 and exiting through the diffuser 35. The spiral channel 32 furthermore has a tangentially outwardly directed air discharge channel 33 with a manifold connection stub 34 for connection to an air manifold (not illustrated) of an internal combustion engine. Through the air discharge channel 33, the air mass flow LM is carried at elevated pressure into the air manifold of the internal combustion engine.

In FIG. 1, the drive unit 20 is not shown in detail and can be embodied either as an exhaust-gas turbine or as an electric-motor drive unit or as a mechanical coupling to the internal combustion engine, e.g. as an intermediate transmission, which is operatively connected to a rotating shaft of the internal combustion engine, making the pressure-charging device 1 into an exhaust-gas turbocharger in one case and into an electric-motor-operated charger, also referred to as an E-booster or E-compressor, or into a mechanical charger in the other case. In the case of an exhaust-gas turbocharger, a turbine impeller would be provided opposite the impeller 13, for example, and said impeller would likewise be arranged for conjoint rotation on the rotor shaft 14 and be driven by an exhaust-gas mass flow.

Upstream of the compressor impeller 13 in the air mass flow LM, the iris diaphragm mechanism 50 is arranged in the air supply channel 36 in addition or as an alternative to a blowoff valve, directly ahead of a compressor inlet 36a (also compressor entry), and/or forms at least one partial region of the air supply channel 36 directly ahead of the compressor inlet 36a of the compressor housing 31.

The iris diaphragm mechanism 50 is designed to at least partially close or to open a diaphragm aperture, thus allowing variable adjustment of a flow cross section for the air mass flow LM for admission to the compressor impeller 13, at least over a partial region of the flow cross section. In this way, the iris diaphragm mechanism 50 allows shifting of the characteristic map for the radial compressor 30 since it acts as a variable inlet restrictor for the compressor impeller 13.

The iris diaphragm mechanism 50 has, for example, a bearing ring 68 fixed in the air supply channel 36 concentrically with the compressor inlet 36a, an adjusting ring 53, which is arranged concentrically therewith, can be rotated about a common center and has an adjusting lever 53a, and a plurality of blades 52 mounted so as to be rotatable about a respective pivot point in the bearing ring 68. The blades 52 each have a plate-shaped blade main body and a pin-shaped actuating element 58 (not visible here), which is designed for the actuation of the respective blade 52, and a bearing element 59 for the pivot mounting of the respective blade 52 on said bearing ring 68, as integral components of the respective blade 52.

Figure 2A:
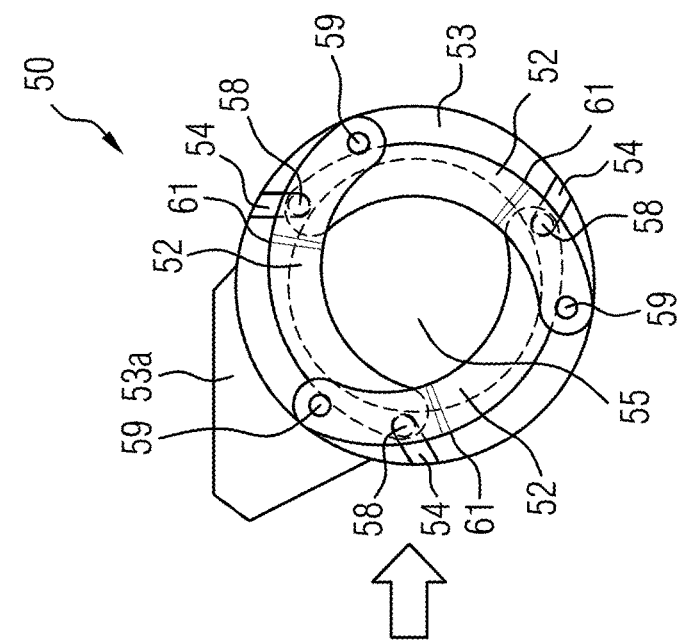
FIGS. 2A to 2C shows schematic plan views of an iris diaphragm mechanism from the direction of the compressor axis in three different operating states according to one exemplary embodiment.
Figure 2B:
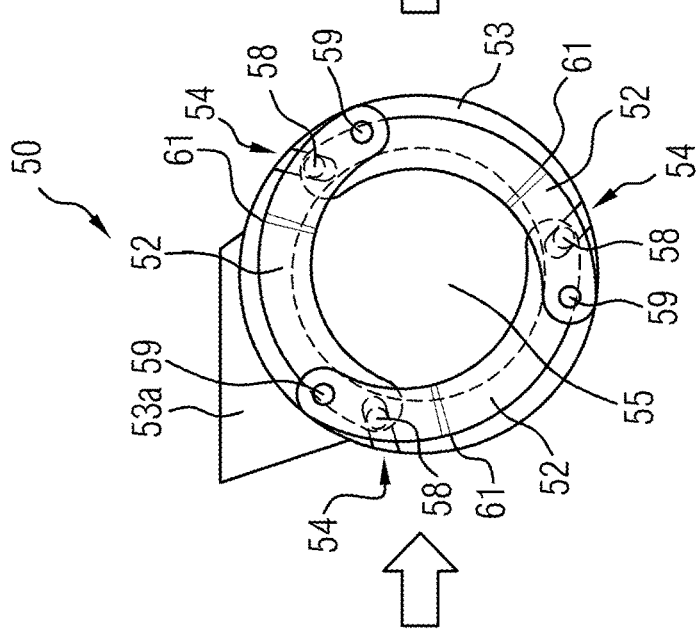
Figure 2C:
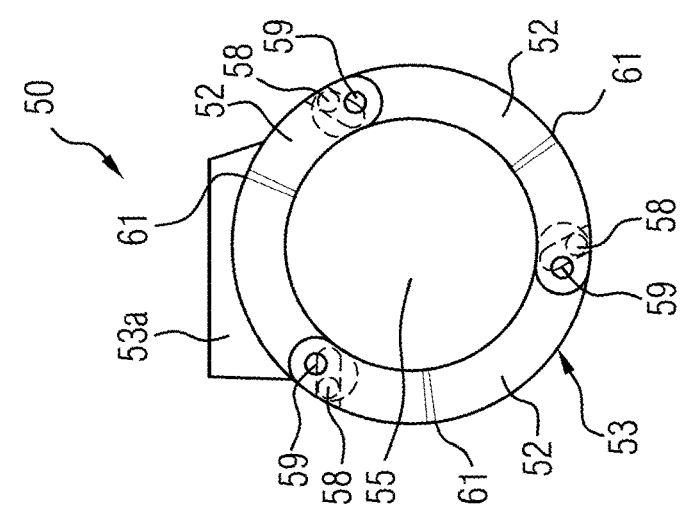
Figure 4:
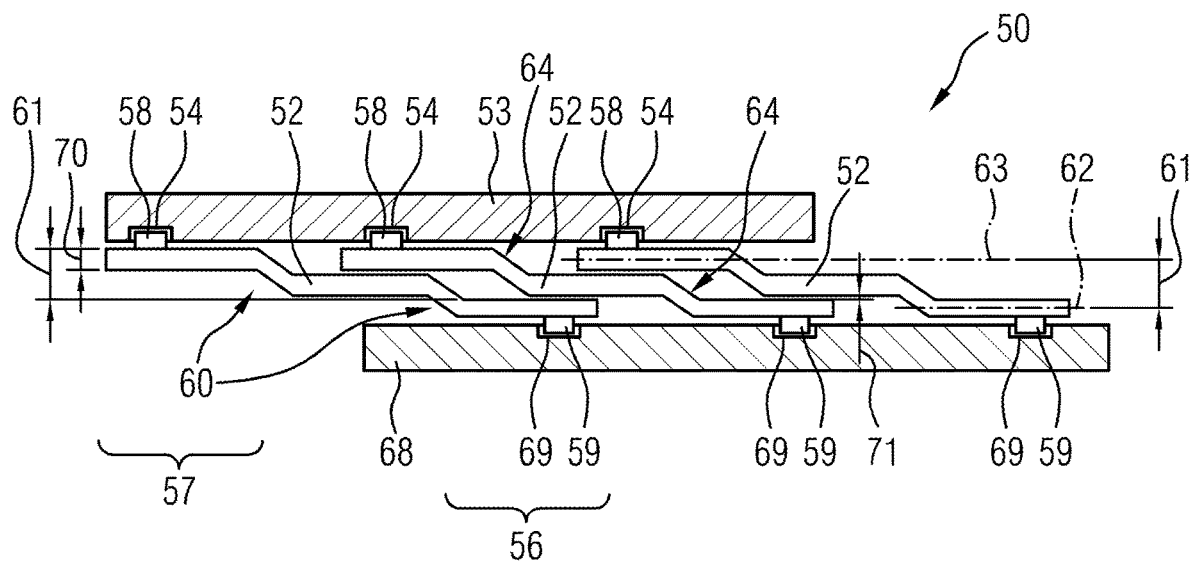
FIG. 4 shows a developed illustration of one exemplary embodiment of the iris diaphragm mechanism of a radial compressor according to the invention viewed from a direction perpendicular to the rotor or compressor axis, with blades according to another exemplary embodiment.
Figure 5:
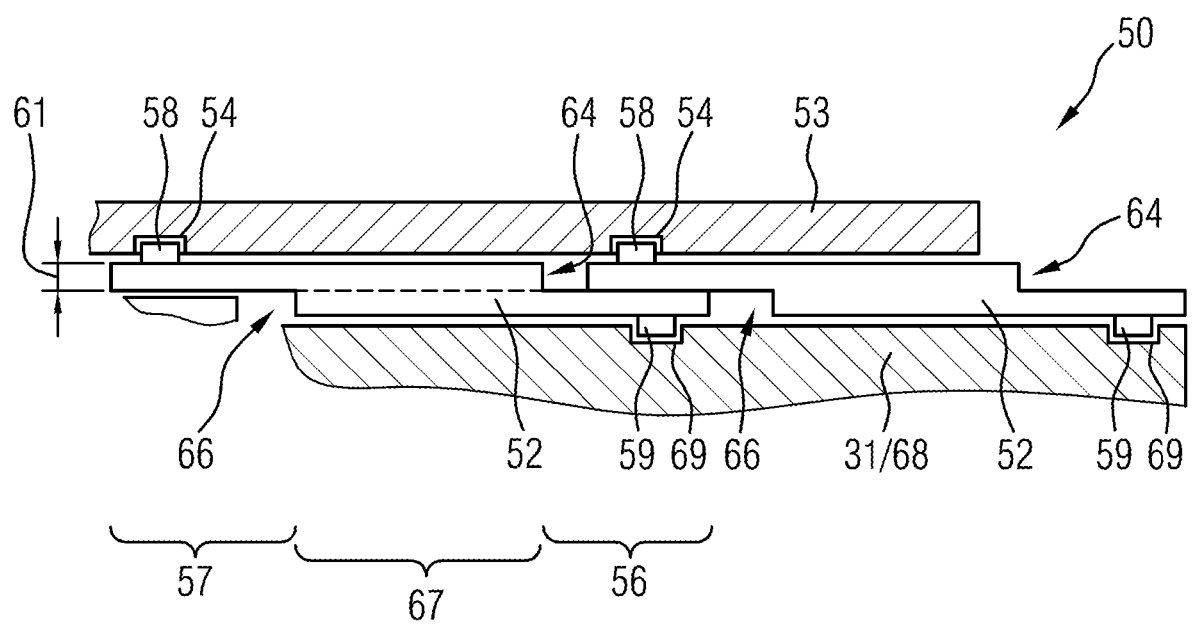
FIG. 5 shows a segment of another developed illustration of one exemplary embodiment of the iris diaphragm mechanism of a radial compressor according to the invention, viewed from a direction perpendicular to the rotor or compressor axis, with blades according to another exemplary embodiment.

FIGS. 2A to 2C show schematically one embodiment of an iris diaphragm mechanism 50 for a radial compressor 30 in three different operating states. The iris diaphragm mechanism 50 has a stationary, fixed (fixed-location) bearing ring 68 (not illustrated here). As illustrated in FIG. 4, the bearing ring 68 can be formed by a separate component, which is fixed in the surrounding housing, e.g. the air supply channel 36. As an alternative, the bearing ring can also be formed directly in the surrounding housing and integrally with the latter. Thus, the bearing ring 68 can also be formed directly on the compressor inlet 36a of the compressor housing 31, as indicated in FIG. 5. As an alternative, it is also possible for a separate housing to be provided for the iris diaphragm mechanism 50, and therefore the iris diaphragm mechanism 50 can be mounted as a separate pre-assemblable functional unit on the compressor housing 31 or in the air supply channel 36.

In this example, three blades 52 are mounted on the bearing ring 68 in such a way as to be rotatable about a respective bearing element 59. For this purpose, the bearing ring 68 has an associated rotary bearing location 69 for each blade 52 (see FIGS. 4 and 5), at which bearing location the respective blade 52 is rotatably mounted by means of its bearing element 59.

Each blade 52 has an actuating element (not visible in FIGS. 2A, 2B and 2C) for actuation by an adjusting ring 53, wherein the bearing element 59 is arranged in an end region of the respective blade 52 situated opposite the actuating element 58.

A pin- or peg-shaped element, by means of which the respective blade 52 is mounted in a hole or recess provided in the bearing ring 68 and forming the bearing location 69, as can be seen in FIGS. 4 and 5, can be provided as a bearing element 59 on the respective blade 52, for example.

The iris diaphragm mechanism 50 furthermore has an adjusting ring 53, which is arranged concentrically with the bearing ring 68 and can be rotated about a common center, said adjusting ring being largely concealed by the blades 52 in FIG. 2A and being visible only by its adjusting lever 53a. In the example in FIGS. 2A to 2C and 4, the adjusting ring 53 has three grooves 54 (only shown indicatively in FIGS. 2A to 2C) for guided actuation of the blades 52. In this case, a groove 54 extending obliquely in relation to the radial direction of the adjusting ring 53 is provided for each blade 52, the actuating element 58 of the respective blade 52 engaging and being guided in said groove. In this way, the blades 52 are moved in synchronism by rotation of the adjusting ring 53. The adjusting ring 53 is mounted at its outer circumference, for example, on or in the housing of the iris diaphragm mechanism 50 or in a housing part formed for this purpose in the compressor housing 31 or the air supply channel 36.

By actuation of the adjusting ring 53, i.e. by rotation about the center shared with the bearing ring 68, the actuating elements 58 of the blades 52 are guided radially inward by the obliquely extending grooves 54 and, in this way, the blades 52 are likewise pivoted radially inward about the respective bearing location 69 and thus narrow a diaphragm aperture 55 of the iris diaphragm mechanism 50. Here, FIG.

2A shows the diaphragm aperture 55 with a maximum opening width, FIG. 2B shows the diaphragm aperture 55 with a reduced opening width, and FIG. 2C shows the diaphragm aperture 55 with a minimum opening width. These illustrations thus show that partial region of the flow cross section for this exemplary embodiment which is variably adjustable by partial closure or opening of the iris diaphragm mechanism 50. The iris diaphragm mechanism 50 thus acts as a variable inlet restrictor and, in this way, as mentioned at the outset, allows advantageous shifting of the characteristic map for the radial compressor 30.

The focus below is on another exemplary embodiments of blades 52 that can be used in the iris diaphragm mechanism 50 described.

Figure 3:
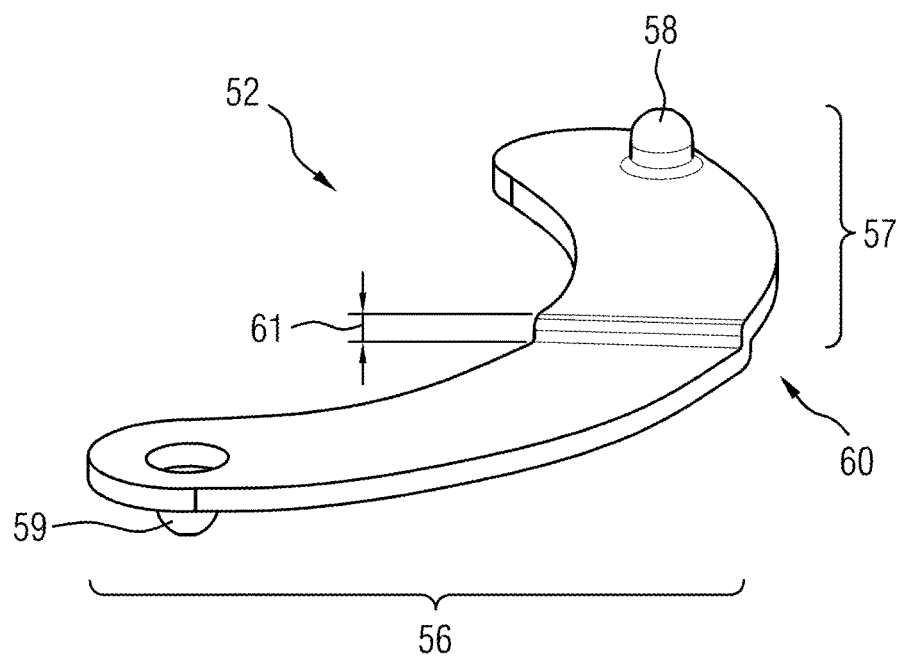
FIG. 3 shows a blade of the iris diaphragm mechanism according to the exemplary embodiment in FIGS. 2A to 2C.

FIG. 3 shows a blade 52 for the iris diaphragm mechanism 50 according to one exemplary embodiment of the invention. The blade 52 in FIG. 3 is a single-crank sheet-metal blade, which is embodied as a simple formed part. The blade 52 has a first blade section 56 and a second blade section 57. In the exemplary embodiment, the two blade sections 56 and 57 form mutually opposite partial regions of the bent blade 52. The first blade section 56 has a bearing element 59 on a side of the blade 52 which is underneath in FIG. 3, while the second blade section 57 has an actuating element 58 on a side of the blade 52 which is on top in FIG. 3. By means of the bearing element 59, the blade 52 is rotatably mounted on the fixed bearing ring or on the surrounding housing part, while the blade 52 engages by means of the actuating element 58 in a guide groove on the adjusting ring 53.

Between the first blade section 56 and the second blade section 57, the blade 52 illustrated in FIG. 3 has a cranked offset 60, with the result that an offset 61 is formed between the first blade section 56 and the second blade section 57, which each have the same wall thickness. This offset 61 allows, as a result, a plurality of the blades 52 shown overlap each other in the assembled state of the iris diaphragm mechanism 50 but can slide past one another without distorting each other.

FIG. 4 shows an iris diaphragm mechanism 50 according to another exemplary embodiment in a developed illustration, from a direction of view perpendicular to the rotor axis of rotation, illustrating the mutual overlap of the individual blades 52. The iris diaphragm mechanism 50 essentially has a fixed bearing ring 68, an adjusting ring 53 and three blades 52. The blades 52 correspond fundamentally to the sheet-metal blade described above but, in contrast to the embodiment in FIG. 3, each have two cranked offsets 60, with the result that an offset 61 is formed between the first blade section 56 and the second blade section 57 of a blade 52 via two steps (illustrated by way of example using the left-hand blade 52 in FIG. 4). The offset 61 relates, for example, to the respective upper sides or lower sides (according to the illustration in FIG. 4) of the first and second blade section 56, 57. In other words or with reference to the profile center of the respective blade section 56, 57, a respective blade section 56, 57 in each case has a central principal plane of extent 62, 63, wherein, in accordance with the offset 61, the two principal planes of extent extend parallel to one another (shown by way of example using the right-hand blade 52 in FIG. 4). In the exemplary embodiment shown in FIG. 4, each blade 52, in particular the two blade sections 56, 57, and the (third) blade section situated between the cranked offsets 60, once again have a substantially constant wall thickness 70 (illustrated once in FIG. 4).

Apparent in this illustration there is in each case a bearing element 59, which is arranged on the side of said blade that is underneath here and in a first blade section 56 of a respective blade 52 and which is rotatably mounted in a respective bearing location 69 of the bearing ring 68. On what is here its topside, each blade 52 furthermore has an actuating element 58, which is arranged in a second blade section 57 and which engages in a respective groove 54 of the adjusting ring 53.

The multiple cranked offsetting allows an overlap between three blades and thus a larger area of overlap, and it is possible for a plurality of blades 52 to slide over one another simultaneously, as shown in FIG. 4. The advantages and functions mentioned at the outset but also a larger variable adjustable partial region of the flow cross section can thereby be achieved.

As shown by way of example using the central blade 52 in FIG. 4, all or some of the cranked offsets 60 of a blade 52 simultaneously define a respective end stop 64, which limits the pivoting range for another blade 52 arranged thereabove and/or therebelow. The end stops 64, i.e. the respective cranked offsets 60, thus limit a minimum opening width of the diaphragm aperture 55 of the iris diaphragm mechanism 50.

A constant clearance 68 can furthermore be formed between the individual blades 52 by the formation of an offset 61, as illustrated by way of example in FIG. 4. The constant clearance 71 is formed in all areas between two blades 52 that are arranged one above the other. This is independent of the number of cranked offsets.

In the same view as in FIG. 4, FIG. 5 shows a segment of an iris diaphragm mechanism 50 with blades 52 according to another exemplary embodiment. Once again, the bearing ring 68, which is here formed directly on the fixed compressor housing 31, for example, as well as the adjusting ring 53 are illustrated. Just two blades 52, of a multiplicity of the blades 52 provided here, are furthermore illustrated here, and, in principle, they are of similar construction to those above and once again have an offset 61, although the offset is not produced by cranked offsets but by a step-type offset 66. In this illustration too, it is accordingly apparent that in each case a bearing element 59, which is arranged on the side of said blade that is underneath here and in a first blade section 56 of a respective blade 52, is rotatably mounted in a respective bearing location 69 of the bearing ring 68. On what is here its topside, each blade 52 furthermore also has an actuating element 58, which is arranged in a second blade section 57 and which engages in a respective groove 54 of the adjusting ring 53.

In the example shown, a single, step-type offset is formed, wherein both the upper side and the lower side of a respective blade 52 have a substantially right-angled step. Here, the two blade sections 56 and 57 are connected by a central part 67, which has a double wall thickness in comparison with the first and/or the second blade section 56 or 57. This allows the stiff embodiment, as mentioned at the outset.

Similarly to the exemplary embodiment in FIG. 4, it is also possible for a plurality of step-type offsets 66 arranged offset relative to one another to be provided. As an option, a respective step-type offset 66 once again forms an end stop 64 with an offset line 65, as described above. What has been stated above also applies similarly in respect of the constant clearance.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A radial compressor for a pressure-charging device of an internal combustion engine comprising:
   a rotor shaft rotatably mounted in a bearing assembly;
   a compressor impeller arranged in a compressor housing for conjoint rotation on the rotor shaft;
   an air supply channel for carrying an air mass flow to the compressor impeller;
   an iris diaphragm to at least partially close and open a diaphragm aperture allowing variable adjustment of a flow cross section for the air mass flow for admission to the compressor impeller, at least over a partial region of the cross section; and
   a plurality of blades for the iris diaphragm, wherein each blade has at least one first and one second blade section and wherein an offset is formed in a direction perpendicular to a principal plane of extent of the blade at least between the first blade section and the second blade section of the respective blade, the at least one first blade section and the at least one second blade section have equal wall thickness.

2. The radial compressor as claimed in claim 1, wherein the offset of the blade sections relative to one another in a direction perpendicular to the principal plane of extent of the blade is formed by one or more cranked offsets.

3. The radial compressor as claimed in claim 2, wherein each blade is designed as a formed part.

4. The radial compressor as claimed in claim 1, wherein the offset is formed by one or more step offsets.

5. The radial compressor as claimed in claim 4, wherein the first blade section and the second blade section are connected via at least one central part of the respective blade, wherein the at least one central part has a wall thickness greater than the first and the second blade sections.

6. The radial compressor as claimed in claim 5, wherein the at least one central part has a double wall thickness in comparison with the first or the second blade sections.

7. The radial compressor as claimed in claim 4, wherein each blade is produced as an injection-molded part.

8. The radial compressor as claimed in claim 1, wherein the blades are arranged in such a way that a substantially constant clearance is formed between the blades during a closure and opening of the diaphragm aperture.

9. The radial compressor as claimed in claim 1, wherein an end stop for the definition of a minimum opening width of a diaphragm aperture of the iris diaphragm is formed by the offset of each blade.

10. A blade for an iris diaphragm, wherein the blade has at least one first and one second blade section and wherein an offset is formed in a direction perpendicular to a principal plane of extent of the blade, at least between the first and the second blade sections, the at least one first blade section and the at least one second blade section have equal wall thickness.

11. A pressure-charging device for an internal combustion engine, the pressure-charging device comprising:
    a radial compressor including:
      a rotor shaft rotatably mounted in a bearing assembly;
      a compressor impeller arranged in a compressor housing for conjoint rotation on the rotor shaft;
      an air supply channel for carrying an air mass flow to the compressor impeller;
      an iris diaphragm, which is designed to at least partially close and open a diaphragm aperture allowing variable adjustment of a flow cross section for the air mass flow for admission to the compressor impeller, at least over a partial region; and
      a plurality of blades for the iris diaphragm, wherein each blade has at least one first and one second blade section and wherein an offset is formed in a direction perpendicular to a principal plane of extent of the blade at least between the first blade section and the second blade section of the respective blade, the at least one first blade and the at least one second blade have equal wall thickness;
    wherein the pressure-charging device is one of: as an exhaust-gas turbocharger, a charger operated by electric motor, and a charger operated via a mechanical coupling to the internal combustion engine.

12. The pressure-charging device of claim 11, wherein the offset of the blade sections relative to one another in a direction perpendicular to a principal plane of extent of the blade is formed by one or more cranked offsets.

13. The pressure-charging device of claim 11, wherein each blade is designed as a formed part.

14. The pressure-charging device of claim 11, wherein the offset is formed by one or more step offsets.

15. The pressure-charging device of claim 14, wherein the first blade section and the second blade section are connected via at least one central part of the respective blade, wherein the at least one central part has a wall thickness greater than the first and the second blade sections.

16. The pressure-charging device of claim 15, wherein the at least one central part has a double wall thickness in comparison with the first or the second blade sections.

17. The pressure-charging device of claim 15, wherein each blade is produced as an injection-molded part.

18. The pressure-charging device of claim 11, wherein the blades are arranged in such a way that a substantially constant clearance is formed between the blades during a closure and opening of the diaphragm aperture.

19. The pressure-charging device of claim 11, wherein an end stop for the definition of a minimum opening width of a diaphragm aperture of the iris diaphragm is formed by the offset of each blade.

* * * * *